United States Patent
Young

(10) Patent No.: US 8,013,467 B2
(45) Date of Patent: Sep. 6, 2011

(54) METHOD AND DEVICE FOR OPTIMIZING SIGNAL POWER ON A WIRED COMMUNICATIONS NETWORK

(75) Inventor: Song-Lin Young, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1235 days.

(21) Appl. No.: 11/676,309

(22) Filed: Feb. 19, 2007

(65) Prior Publication Data

US 2008/0199001 A1    Aug. 21, 2008

(51) Int. Cl.
- H02J 1/00 (2006.01)
- H02J 3/00 (2006.01)
- H02J 3/34 (2006.01)

(52) U.S. Cl. ............... 307/4; 307/DIG. 1; 307/3
(58) Field of Classification Search ............ 307/1, 2, 307/3, DIG. 1, 4

See application file for complete search history.

(56) References Cited

U.S. PATENT DOCUMENTS

| 5,991,269 | A | 11/1999 | Williamson et al. |
| 7,864,658 | B2 * | 1/2011 | Wakisaka et al. ............ 370/203 |
| 2005/0078803 | A1 | 4/2005 | Wakisaka et al. |
| 2006/0140260 | A1 | 6/2006 | Wasaki et al. |

FOREIGN PATENT DOCUMENTS

| JP | 2005311411 | 11/2005 |
| JP | 2006140953 | 6/2006 |
| JP | 2006180354 | 7/2006 |
| JP | 2006203481 | 8/2006 |
| JP | 2006222683 | 8/2006 |

OTHER PUBLICATIONS

MacFarlane, "A probe for measurement of electrical unbalance of networks and devices", IEEE Trans. Electromagn. Compat., vol. 41, No. 1, pp. 3-14, Feb. 1999.

See, K.Y.; Kamarul, A.; So, P.L. "Longitudinal conversion loss of power line network for typical Singapore household" Power Engineering Conference, 2005. IPEC 2005. The 7th International.

Ministerial Ordinance Partially Revising the Regulations for Enforcement of the Radio Act (Ministerial Ordinance No. 119 of Oct. 4, 2006), Ministry of Internal Affairs and Communications of Japan, Oct. 4, 2006.

(Continued)

Primary Examiner — Michael Rutland Wallis
(74) Attorney, Agent, or Firm — Thomas R. Berthold

(57) ABSTRACT

A method and network device increases the power of the signal transmitted by the device on a wired communications network, such as a powerline communications (PLC) network, without exceeding the maximum allowable common-mode (CM) current specified by regulatory bodies. The device is first tested for regulatory body compliance on a standard network. The output voltage of the device is adjusted until the maximum allowable CM current is detected, and this voltage level and CM current are recorded and stored in non-volatile memory of the device. The device is then connected to the actual network and the output voltage set to the previously recorded value. At this voltage level, the CM current in the actual network is measured and recorded. The difference between the CM current measured with the device on the actual network and the maximum allowable CM current is calculated and used to calculate the amount the output power of the signal from the device can be increased without exceeding the maximum allowable CM current.

9 Claims, 4 Drawing Sheets

OTHER PUBLICATIONS

Method of Measuring Electric Currents and Voltages of Conducted Interfering Waves and Field Strengths of Radiated Interfering Waves in Accordance with the Provisions of the Regulations for Enforcement of the Radio Act Article 46-2 (1)(v)-(3) and the Ordinance Regulating Radio Equipment Article 60(ii)-(2) (Ministerial Announcement No. 520) Ministry of Internal Affairs and Communications of Japan, Oct. 4, 2006.

Sugie, T. & Fujita, M.: Fiidobakku Seigyo Nyumon (Introduction to Feedback Control), 1st ed., pp. 5-6, Corona Publishing Co., Ltd., Japan, Feb. 25, 1999.

* cited by examiner

METHOD AND DEVICE FOR OPTIMIZING SIGNAL POWER ON A WIRED COMMUNICATIONS NETWORK

BACKGROUND OF THE INVENTION

1. Field of the Invention

The invention relates generally to wired communications networks, such as alternating-current (AC) powerline communications (PLC) networks, and more particularly to a method and network device for optimizing the communications signal power on such networks.

2. Description of the Related Art

When an electronic device is transmitting a communication signal on a wired communications network, the unbalance of the signal in the network wiring system can be represented by the common-mode (CM) current. The concept is that if the device drives the wired network via differential signals, the current that flows into one terminal should be of equal amount, but out of phase with respect to current flowing into the other terminal. Thus, CM current refers to the un-cancelled net current in a pair of wires. The amount of CM current from a device is mainly dependent on the amount of unbalance of the network load (impedance) presented to the device.

CM current is a direct source of radiation interference. To reduce radiation interference, regulatory bodies often specify the maximum allowable CM current when the device is connected to the network. The CM current is typically measured with the device connected to a special test component of known fixed impedance, called an Impedance Stabilization Network (ISN). The ISN is a standard component that provides a predetermined load with the required degree of unbalance specified for the compliance test, which should not vary with time, location or setup. If the device passes the test, then it should generate equal or less CM current when connected to the actual network to minimize radiation interference.

However, there is a fixed relation between CM current and the differential mode (DM) voltage of the transmitted signal. By specifying the maximum allowed CM current, the level of DM voltage permitted is also limited, which limits the signal power and thus the communication performance of the device.

One type of wired communications network is an alternating-current (AC) powerline communications (PLC) network that uses the existing electrical wiring in a home or single building, such as a PLC network based on the HomePlug™ standard. In this type of network, personal computers (PCs) and various consumer electronic (CE) devices, including audio and/or video (audio-visual or AV) devices such as stereo receivers, digital video recorders (DVRs), digital TVs, and AV servers, are connected to the PLC network by adapters that enable the devices to transmit and receive communications signals over the electrical wiring. The adapter may be a separate adapter or be embedded in the PC or CE device at time of manufacture. For example, a separate HomePlug™ adapter for a PC or CE device may have an Ethernet port for input from the PC or CE device and an output port that plugs into an AC wall outlet.

PLC networks do not have a constant characteristic line impedance because conditions in a typical AC wiring network can change due to locations of electrical outlets, types of terminations, and usage of appliances. In addition, the maximum allowable CM current specified by regulatory bodies may be set at an arbitrarily low value to account for a wide range of networks with a wide range of load unbalance. For these reasons, the actual CM current when a PLC adapter is transmitting on a PLC network is often less than that the maximum allowable CM current. Thus the transmitted signal power could be increased, thereby improving performance of the communication system, without exceeding the maximum allowable CM current. However, the transmitters in PLC adapters typically have a fixed output power that is determined by the maximum allowable CM current specified by the compliance test. In addition, it is not possible for the PLC adapter to determine the actual CM current when it is transmitting on the network.

What is needed is a method and device that optimizes the signal power transmitted on a wired communications network without exceeding the maximum allowable CM current.

SUMMARY OF THE INVENTION

The invention is a method and network device for increasing the power of the signal transmitted by the device on a wired communications network, such as a PLC network, without exceeding the maximum allowable CM current. The device, which may be a HomePlug™ adapter for a PLC, is first tested for regulatory body compliance on a standard network. The output voltage of the device is adjusted until the maximum allowable CM current is detected, and this voltage level and CM current are recorded and stored in non-volatile memory of the device. The device is then connected to the actual network and the output voltage set to the previously recorded value. At this voltage level, the CM current in the actual network is measured and recorded. The difference between the CM current measured with the device on the actual network and the maximum allowable CM current is calculated. Because the actual network will typically have a more balanced load than the standard network, this difference will be a negative value. The calculated CM current difference is then used to calculate the amount the output power of the signal from the device can be increased without exceeding the maximum allowable CM current. The network device includes a current probe for measuring the CM current when connected to the actual network. Because only the difference in CM current is needed to calculate the amount of output power increase, this current probe does not need to be as complex or costly as current probes used to perform the compliance test. The network device may measure the CM current on the actual network each time it is powered on or at regular intervals so that the output power can be adjusted as load conditions on the actual network vary. In this manner the output power from the device is optimized to varying network load conditions without exceeding the maximum allowable CM current.

For a fuller understanding of the nature and advantages of the present invention, reference should be made to the following detailed description taken together with the accompanying figures.

DETAILED DESCRIPTION OF THE INVENTION

Figure 1:
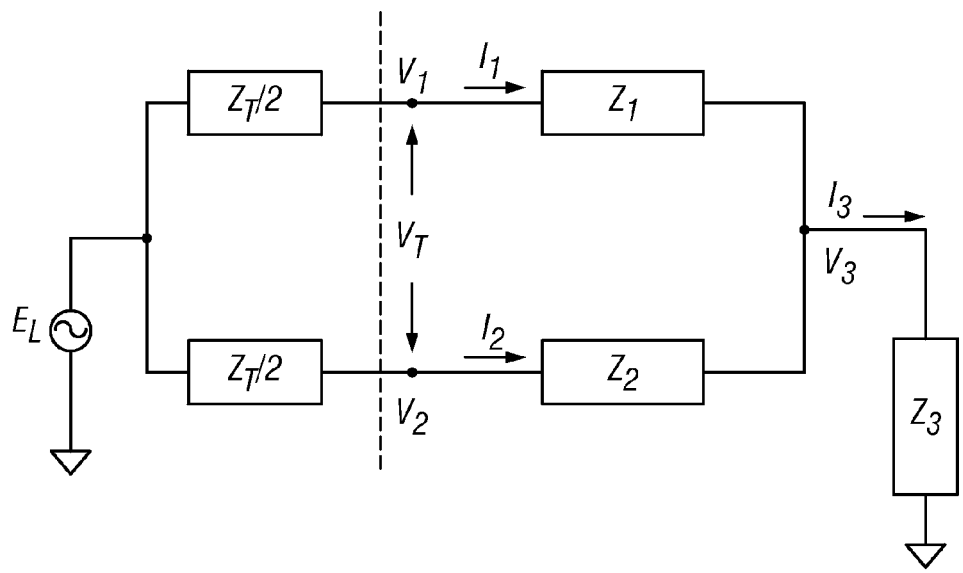
FIG. 1 is a test circuit for explaining longitudinal conversion loss (LCL) and shows a signal source $E_L$, with source impedance $Z_T$, injected into a pair of wires to generate a differential voltage $V_T$ between two terminals.

The measurement of common-mode (CM) current is typically done by connecting the equipment under test (EUT) to a special component called an Impedance Stabilization Network (ISN), which is described in International Electrotechnical Commission (IEC), CISPR 22, Fifth Edition, 2005. Regulatory bodies usually specify ISN for compliance testing in terms of CM impedance and Longitudinal Conversion Loss (LCL). ISN provides a standardized loading condition of fixed impedances and the LCL value representing required network balance. Under such load conditions, a maximum level of CM current is permitted.

For a given wiring system, the relationship between output voltage ($V_T$) and CM current, $I_{CM}$, is a function of source impedance (the device) and load impedances (the network) and can be expressed in terms of LCL. This function has been reported by I. P. Macfarlane, "A probe for measurement of electrical unbalance of networks and devices", in *IEEE Trans. Electromagn. Compat.*, vol. 41, no. 1, pp. 3-14, February 1999. The relationship can be written in the following form:

$$I_{CM}(\text{dB}\mu A) = V_T(\text{dB}\mu V) - LCL(Z_i) - f(Z_i) \qquad \text{Equation (1)}$$

where $Z_i$ represent network impedances, and LCL is in fact also a function of $Z_i$. (Explicit forms of LCL are given in Equations (10) and (11) below).

$V_T$ is the voltage between two output terminals and is the information-bearing signal. Higher $V_T$ level is normally desirable for better system performance. If a signal of level $V_T$ is applied respectively to two different networks: (a) the ISN; and (b) an actual network with an arbitrary load, and Equation (1) is used to obtain the difference of $I_{CM}$, it gives:

$$\Delta I_{CM} = -\Delta LCL - \Delta f(Z_i), \text{ in dB.} \qquad \text{Equation (2)}$$

It can be seen that it is possible the CM current with the load of network (b) can be less than with the load of network (a), the ISN. This condition will most likely occur if the regulatory requirement is set to be so stringent (i.e., a low LCL for a highly unbalanced condition) that most networks in real application scenarios would present better balanced loads. Thus it is possible to increase $V_T$ dynamically with the device connected to the actual network of unknown load impedances without exceeding the regulatory requirements.

This invention provides a method for communication performance optimization for devices connected to wired networks which present varying load conditions to the devices, while still meeting the regulatory requirements. The method of this invention can be summarized as follows:

Measure CM current with ISN, the load (a), and record $V_T(a)$ with $I_{CM}(a) \leq$ maximum $I_{CM}$;

Set $V_T = V_T(a)$, and measure CM current with the EUT connected to the actual network of load (b), and record $I_{CM}(b)$;

Calculate $\Delta I_{CM} = [I_{CM}(b) - I_{CM}(a)]$; and

Adjust $V_T(b)$ level based on the value of $\Delta I_{CM}$ value such that $I_{CM}(b) \leq$ maximum $I_{CM}$.

The device needs to be calibrated only once by using ISN in the factory or test laboratory. The reference data, $V_T(a)$ and $I_{CM}(a)$, can be stored in non-volatile memory of devices being manufactured. The deviation of CM current, instead of the absolute value of CM current, is used to adjust $V_T$. This allows the use of a simpler CM current measurement method instead of the complex setup and equipment involved in the formal compliance test for the measurement of CM current. Also, the signal level is set dynamically based on CM mode current deviation ($\Delta I_{CM}$). There is no need to measure actual network impedances and related LCL.

Longitudinal Conversion Loss

CM current is closely related to balance of a network's wiring structure, which can be determined by the parameter Longitudinal Conversion Loss (LCL). LCL is defined by $$LCL(\text{dB}) = 20\log_{10}\left|\frac{V_T}{E_L}\right| \qquad \text{Equation (3)}$$

with $E_L$ and $V_T$ shown in the test circuit of FIG. 1. The signal source $E_L$, with source impedance $Z_T$, is injected into a pair of wires and generates a differential voltage $V_T$ between terminals. On the right side of FIG. 1 is the wiring system under test modeled by a Y-shape network of impedances $Z_i$ (i=1, 2, 3) among terminals of wires and system ground. A network with load $Z_2 = Z_1$ has a perfectly balanced loads. In such a case, $I_1$ and $I_2$ are of equal magnitude and out of phase since the system is symmetric with the mirrored circuit driven by out-of-phase voltage source. Also, it causes $I_3$ (the CM current) to be zero, and therefore no net current flows into $Z_3$, with all current entering network ($I_1$) returning to the device ($I_2$).

However, due to mismatch of wires and termination components, it is virtually impossible to have perfectly balanced loads in an actual wiring system. Thus, for the general case of $Z_2 \neq Z_1$, $I_3$ becomes the net current flowing into $Z_3$ and is the CM current since it represents the portion of current that does not return to the device. It is also the source of radiation from the wiring system, which causes regulatory concern. To calculate LCL, $V_T$ can be found by solving $I_1$, $I_2$. Applying Kirchhoff's law in FIG. 1, $V_1$, $V_2$, $V_T$ can be expressed as follows:

$$V_1 = E_L - (I_1)[Z_T/2] \qquad \text{Equation (4)}$$

$$V_2 = E_L - (I_2)[Z_T/2] \qquad \text{Equation (5)}$$

$$V_T = V_1 - V_2 = (I_1 - I_2)[Z_s/2] \qquad \text{Equation (6)}$$

Also, from the Y-network of $Z_1$, $Z_2$, and $Z_3$ $$V_1 = I_1 Z_1 + I_3 Z_3 \qquad \text{Equation (7)}$$

$$V_2 = I_2 Z_2 + I_3 Z_3 \qquad \text{Equation (8)}$$

$$I_3 = I_1 + I_2 \qquad \text{Equation (9)}$$

By substituting $V_1$, $V_2$ from Equations (4), (5) into Equations in (7), (8), $I_1$, $I_2$ can be solved from (7), (8) and (9) in terms of $Z_1$, $Z_2$, $Z_3$, $Z_T$, and $E_L$. Combining Equations (3), (6), and $I_1$, $I_2$ results in the following:

$$LCL = 20\log_{10}\left|\frac{(Z_0 + Z_T + 4Z_3)(Z_0 + Z_T)}{2Z_T(\Delta Z)} - \frac{\Delta Z}{2Z_T}\right| \qquad \text{Equation (10)}$$

where $Z_0 = Z_1 + Z_2$, and $\Delta Z = |Z_1 - Z_2|$.

LCL provides a measure of wiring unbalance with dependency on $\Delta Z$, the difference of $Z_1$ and $Z_2$. For a given $V_T$ value, a greater LCL will in general result in less CM current into $Z_3$ due to better balance properties. Conversely, for a specified $I_{CM}$, a greater LCL allows a higher $V_T$, which means larger signal power.

Common-Mode Current

Figure 2A:
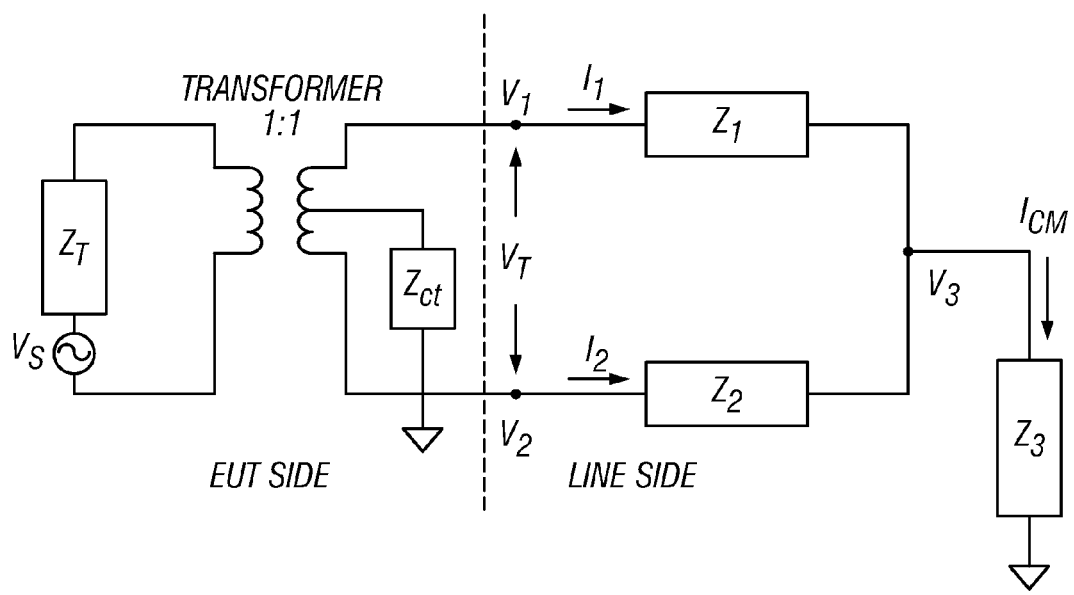
FIG. 2A is the circuit of FIG. 1 with the test signal $E_L$ replaced by the equipment under test (EUT), where the EUT is modeled by a signal source $V_S$ with source impedance $Z_T$, and $Z_{ct}$ is the common mode impedance of the EUT.
Figure 2B:
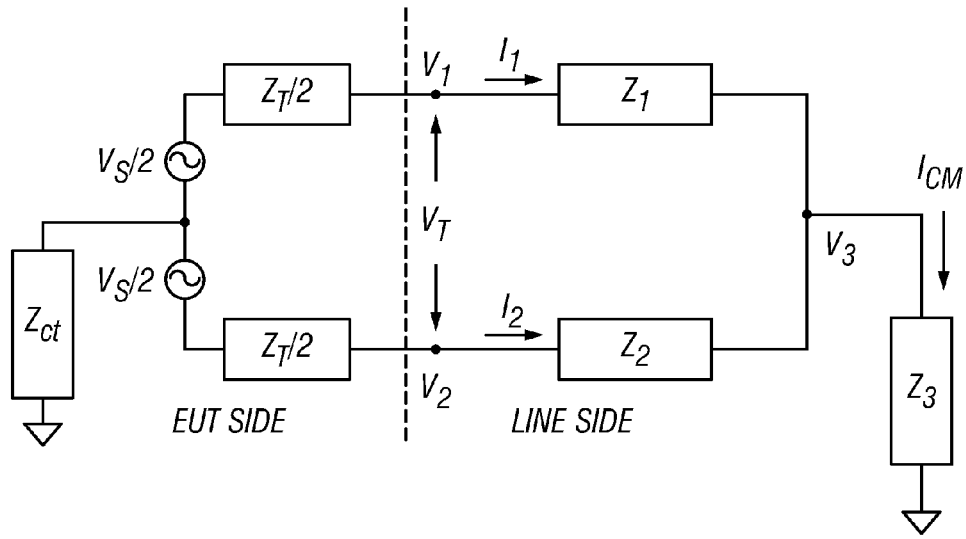
FIG. 2B is an equivalent circuit for the circuit of FIG. 2A with the signal source $V_S$ and source impedance $Z_T$ re-arranged in differential forms with respect to impedance $Z_{ct}$.

CM current needs to be considered when a device is connected to wired networks. In the circuit of FIG. 1, if the test signal $E_L$ is replaced by the EUT, it becomes the system shown in FIG. 2A, where the device is modeled by a signal source $V_S$ with source impedance $Z_T$, and $Z_{ct}$ is the common mode impedance of EUT. FIG. 2B is an equivalent circuit with the signal source $V_S$ and source impedance $Z_T$ re-arranged in differential forms with respect to impedance $Z_{ct}$. The signal source $V_S$ and source impedance $Z_T$ are evenly divided into two parts assuming the EUT is ideally balanced with a much higher LCL than the wires.

Following the same procedure for Equations (4) to (9) for solving for $I_1, I_2$, the CM current $I_{CM}=I_1+I_2$ can be calculated in terms of $Z_1, Z_2, Z_3, Z_T$, and $V_S$. Combining $I_{CM}$ with LCL using Equation (10), CM current $I_{CM}$ can be approximated by the following, as described by the previously-cited Macfarlane reference:

$$I_{cm}(dB\mu A) \approx \\ V_T(dB\mu V) - LCL(dB) - 20\log_{10}\left|2Z_0 \cdot \frac{Z_{cm}+Z_{ct}}{Z_0+4Z_{cm}}\right| \quad \text{Equation (11)}$$

where $Z_{cm}=Z_3+[Z_1 Z_2]/[Z_2+Z_1]$ is the common mode impedance of the Y network, and $Z_0=Z_2+Z_1$ is the differential mode impedance, i.e., $Z_0$ is the impedance as seen by the (differential) communication signal.

$\Delta I_{CM}$ Due to Load Variations

For the purpose minimizing radiation interference, regulatory bodies usually specify the impedance stabilization network (ISN) for the compliance test. The ISN provides a standardized loading condition of fixed impedances (within the frequency band considered) with the LCL value specified for required network balance. The signal power, $V_T$, is therefore implicitly limited by Equation (11). Furthermore, the LCL of the ISN can be specified to an arbitrarily low value to ensure that, statistically, for the majority of occasions the actual wiring conditions will have better balanced loads.

When a device is attached to a wired network, the actual LCL value of the wiring system depends on the impedances ($Z_1, Z_2, Z_3$ of FIG. 1) presented to the device. It is likely that the LCL value as well as the $I_{CM}$ to $V_T$ relationship of Equation (11) is frequency dependent, and therefore can be either greater or less than the value specified for the compliance test. Furthermore, for types of wires that do not have a constant characteristic line impedance the time and location of the device access point needs to be accounted for. A PLC network is one such example because conditions in a typical AC wiring in a household can change dynamically due to locations of outlets, types of terminations, and usage of appliances.

This invention addresses the need to maximize the signal power for improving communication performance while still meeting the regulatory test requirements. This is particularly desirable for systems with network impedances that vary with time and location of the device's access point. With these considerations, it is very difficult to apply Equation (11) directly for predicting $I_{CM}$ or $V_T$ without prior knowledge of $Z_1, Z_2, Z_3$, and the associated LCL. On the other hand, since $I_{CM}$ is a function of both $V_T$ and network impedance $Z_i$ (i=1-3), it is possible to detect the change of $I_{CM}$ and determine the aggregate effect due to variations of $Z_i$.

Considering that Equation (11) is applied respectively to: (a) the ISN; and (b) an actual network with an arbitrary load while the terminal voltage $V_T$ is kept at the same value, then $$\Delta I_{CM}=-\Delta LCL-\Delta f(Z_i) \quad \text{Equation (12)}$$

Where $f(Z_i)$ is the second term on the right side of Equation (11), and the differential terms indicate the value deviations of using loads (b) and load (a). For load (a), the ISN, LCL and $Z_i$ are known and fixed values.

Equation (12) shows that it is possible $I_{CM}$ will decrease (negative $\Delta I_{CM}$) as a result of changing the load impedance from (a) the ISN load to (b) any network with a load with combined positive $\Delta LCL$ and $\Delta f(Z_i)$, which means a more balanced network than the ISN.

To understand how $V_T$ can be adjusted according to load impedances, Equation (11) can be re-written as $$V_T(dB\mu V)=I_{CM}(dB\mu A)+K(dB) \quad \text{Equation (13)}$$

where K is a parameter completely determined by the load impedances $Z_i$. K can be considered as a constant for a given pair of wires assuming that (1) $Z_i$ do not vary over the time duration under consideration, and (2) there is only one frequency component considered within the signal spectrum. It is envisioned that each frequency component of interest can be treated individually, and the frequency partition is small enough such that $Z_i$ are constant at a given frequency.

Figure 3:
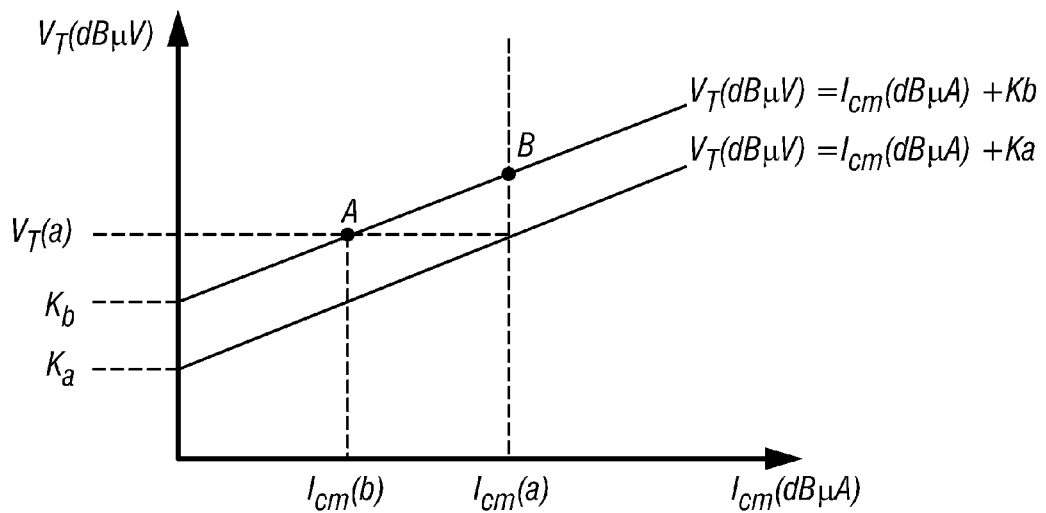
FIG. 3 are graphs of $V_T$ as functions of $I_{CM}$ for two different network conditions.

Applying Equation (11) to loads (a) and (b) and plotting the corresponding lines in log scale results in FIG. 3. It can be seen that if $I_{CM}$ (a) is the maximum CM current allowed for the ISN as the load and with $V_T(a)$ as the terminal voltage for both loads, then $$V_T(a)=I_{CM}(a)+Ka \quad \text{Equation (14)}$$

and $$V_T(a)=I_{CM}(b)+Kb, \text{ [point } A \text{ on FIG. 3]} \quad \text{Equation (15)}$$

By subtracting Equation (14) from Equation (15), Kb can be found to be $$Kb=Ka-[I_{CM}(b)-I_{CM}(a)]=Ka-\Delta I_{CM} \quad \text{Equation (16)}$$

Then on line (b) in FIG. 3, the corresponding $V_T$ (point B) for $I_{CM}$ (a) is $$V_T(B)=I_{CM}(a)+Kb=I_{CM}(a)+[Ka-\Delta I_{CM}]=V_T(a)-\Delta I_{CM} \quad \text{Equation (17)}$$

Equation (17) shows that $V_T(B)>V_T(a)$ as long as $\Delta I_{CM}$ is negative. Thus, it is possible that $V_T$ can be adjusted according to the constraint of the maximum $I_{CM}(a)$ value, which is determined by the ISN specified from regulatory compliance requirements.

Method for $V_T$ Adjustment in a PLC Network

The general procedure according to this invention to achieve maximum signal power for performance optimization in a wired communications network are summarized as follows:

(1) Measure CM current with the ISN, the load (a), and record $V_T(a)$ with $I_{CM}(a) \leq$ maximum $I_{CM}$;
(2) Set $V_T=V_T(a)$, and measure CM current with the EUT connected to the actual network of load (b), and record $I_{CM}(b)$;
(3) Calculate $\Delta I_{CM}=[I_{CM}(b)-I_{CM}(a)]$; and
(4) Adjust $V_T(b)$ level based on the value of $\Delta I_{CM}$ value such that $I_{CM}(b) \leq$ maximum $I_{CM}$.

This general procedure will be explained for a specific implementation in a HomePlug™ PLC network, with reference to FIGS. 4 and 5. The HomePlug Power Alliance, a non-profit industry association, has published standards for the transmission of communications and audio-visual (AV)

media over home power lines that distribute power at 50-60 Hz. The basic transmission technique is Orthogonal Frequency Division Multiplexing (OFDM), which is well known in the literature and in industry. The basic idea of OFDM is to divide the available spectrum into several narrowband, low data rate subcarriers. To obtain high spectral efficiency the frequency response of the subcarriers are overlapping and orthogonal, hence the name OFDM. Each narrowband subcarrier can be modulated using various modulation formats. By choosing the subcarrier spacing to be small, the channel transfer function reduces to a simple constant within the bandwidth of each subcarrier. In this way, a frequency selective channel is divided into many flat fading subchannels, which eliminates the need for sophisticated equalizers. The OFDM used by HomePlug AV (HPAV) provides high quality, multi-stream entertainment-oriented networking over existing AC wiring and uses 917 subcarriers (tones) in the frequency band between 2 MHz and 28 MHz.

In the method of this invention, all values of $I_{CM}$, and corresponding $V_T$, are measured in the frequency domain. If measurements are done in the time domain, then a Fast Fourier Transform (FFT) operation may be used to obtain the frequency domain components.

In Step 1, for a specific implementation, $V_T(a)$ and $I_{CM}(a)$ need to be measured only once using the specified ISN in the factory or laboratory of the compliance test. The resulting data can be stored in the non-volatile memory of the devices for the remainder of the $V_T$ calculation.

In Step 3, since only the deviation of $I_{CM}$, i.e., $\Delta I_{CM}$, is required, precise accuracy of $I_{CM}$ is not important. An estimation of $I_{CM}$ can be done as long as the measurement gives a reading proportional to the accurate $I_{CM}$ value. There is no need to employ the usual setup required for the formal compliance test. Instead, a simpler and less expensive detection approach can be used, which makes it possible to incorporate the $I_{CM}$ measurement into the devices to enable $V_T$ adjustment during time-varying network load conditions.

The resolution of FFT can be a choice of system operation rather than the 9 kHz resolution bandwidth normally used for the compliance test. For example, the tone (carrier) spacing of the OFDM system may be a more convenient option for implementing this method.

It is possible that at some frequencies $\Delta I_{CM}$ is positive, which implies that $V_T$ needs to be reduced or that that particular frequency not be used. However, the method of this invention is mainly applicable to the case where the LCL of the ISN is specified to represent networks of very poor balance to ensure low radiation interference. Thus in most practical applications, the majority of networks will result in better balance; i.e., a higher LCL than that of the ISN.

To distinguish CM mode current defined in the compliance test from the estimated value used in this invention, the term "Reference CM current" will be used as $I_{CM}$. Thus Reference CM current will be used for the purpose of estimating network balance and adjusting the $V_T$ based on Reference CM current deviation $\Delta I_{CM}$. The assumption is that the selected Reference CM current for monitoring has a linear relationship with the CM current value obtained in the compliance test. The absolute value of CM current is not crucial since it is only the deviation that is of interest, and the deviation can be derived from changes of Reference CM current. The Reference CM current will be a reasonable replica of the actual CM current as defined by the regulatory test and will retain the crucial waveform properties in both time and frequency domains. Thus, because only $\Delta I_{CM}$ is required to be determined in this invention, a complex and expensive current probe, like that required for the compliance test measurement, is not required to be incorporated into the devices.

Figure 4:
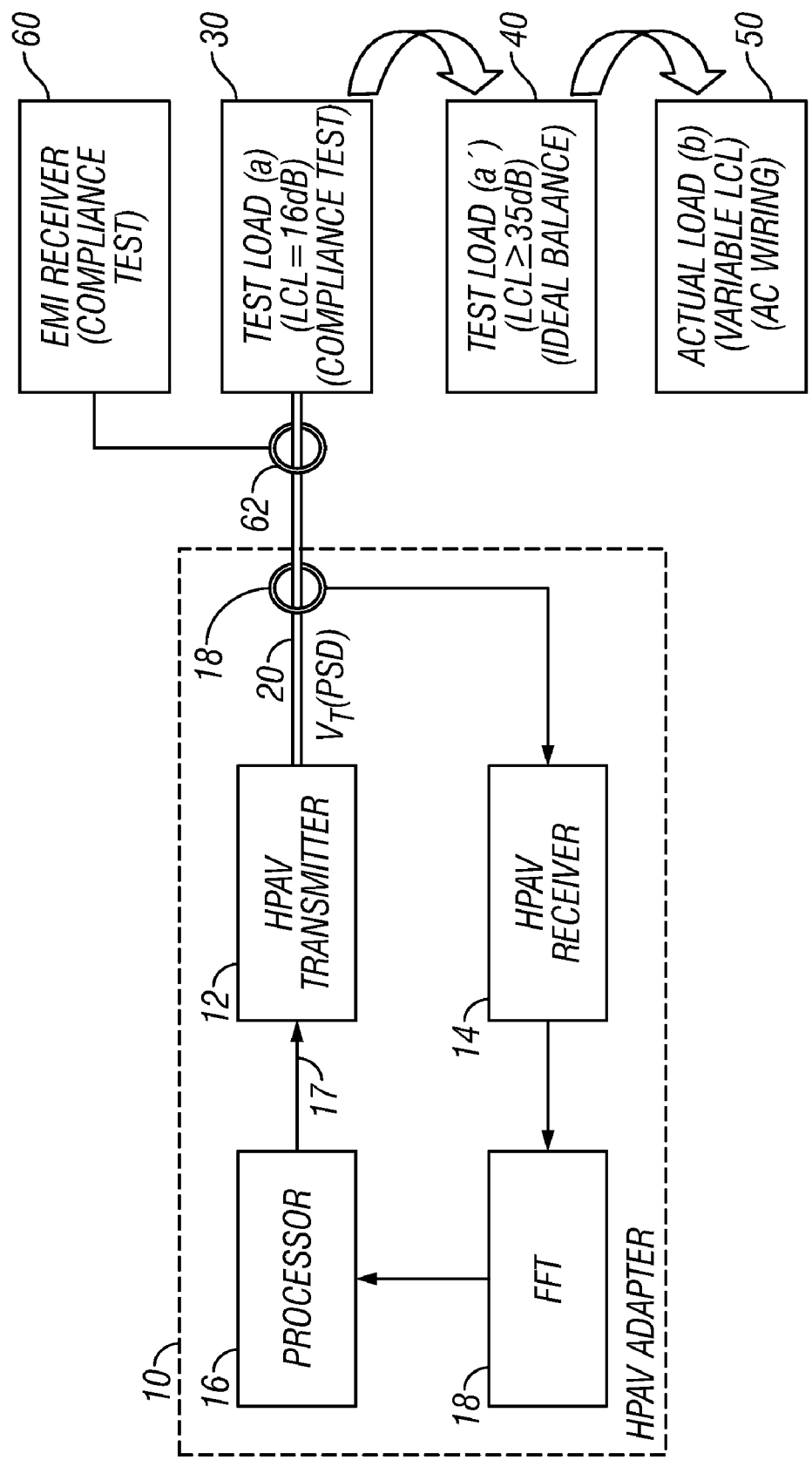
FIG. 4 is a test setup for the method of this invention and illustrates the general functional components of a HomePlug AV (HPAV) adapter for connection to various network loads.

FIG. 4 shows a test setup for implementation of the method of this invention, and illustrates the general functional components of a HomePlug AV (HPAV) Adapter for connection to various network loads. The HPAV Adapter 10 is capable of transmitting a signal on line 20 to either Test Load (a) 30, Test Load (a') 40, or Actual Load (b) 50. When Adapter 10 is connected to Test Load (a) 30, an electromagnetic interference (EMI) Receiver 60 is connected to line 20 for the compliance testing. The EMI Receiver 20 has a highly precise CM current probe 62 to measure actual CM current. The HPAV Adapter 10 includes Transmitter 12, Receiver 14, a Processor 16, and a Fast Fourier Transform (FFT) functional block 18, which may be a computer program or software executed by Processor 16, and a Reference CM current probe 18. The Processor 16 is connected by line 17 to Transmitter 14 and controls the output voltage $V_T$ of Transmitter 12, typically by setting its power spectral density (PSD), which describes how the power of the signal is distributed with frequency.

The method will now be described with reference to FIG. 4 as follows:

(1) Connect the Adapter 10 to Test Load (a) 30, which is the ISN and LCL (for example 16 dB) for the compliance test.
(2) Set an initial power level on Transmitter 12.
(3) Measure the actual CM current with probe 62.
(4) Adjust the power of Transmitter 12 until the actual CM current measured with probe 62 is the maximum CM allowable by the compliance test. Record this as $V_T(a)$ in the form of PSD, to obtain $V_T(a)$ for each of the subcarrier frequencies.
(5) Receive the Reference CM current with probe 18 through Receiver 14, which in a HPAV system has a 24.4 kHz tone spacing.
(6) Perform a FFT operation on the Reference CM current to obtain the frequency distribution of Reference CM current, i.e., the Reference CM current at each of the subcarrier frequencies.
(7) Record the Reference CM current values as $I_{CM}(a)$.
(8) Connect the Adapter 10 to Actual Load (b) 50, which is the AC wiring of the PLC network with variable LCL.
(9) Set the power of Transmitter 12 to $V_T(a)$ in the form of PSD recorded in step (4).
(10) Receive the Reference CM current with probe 18 through Receiver 14.
(11) Perform a FFT operation on the Reference CM current to obtain the frequency distribution of Reference CM current, i.e., the Reference CM current at each of the subcarrier frequencies.
(12) Record the Reference CM current values as $I_{CM}(b)$.
(13) Calculate $\Delta I_{CM} = I_{CM}(b) - I_{CM}(a)$ for each frequency.
(14) Adjust the power to Transmitter 12 to $V_T$ (PSD per frequency) according to $\Delta I_{CM}$ with Equation (17) to obtain $V_T(B)$, i.e., increase $V_T$ from $V_T(a)$ by the absolute value of $\Delta I_{CM}$.

In FIG. 4, an optional test with Test Load (a') 40 may also be done. A very high LCL (e.g., >35 dB) can be considered as a perfectly balanced load. The Reference CM current detected with such a load will be the lowest one that the Receiver 14 should be able to detect. As shown in FIG. 4, a Reference CM current probe 18 is required to make the $\Delta I_{CM}$ measurement. For an implementation intended for mass production, a typical clip-on current probe for probe 18, like probe 62 used for the CM current compliance test, is not suitable due to considerations of both cost and size.

Figure 5:
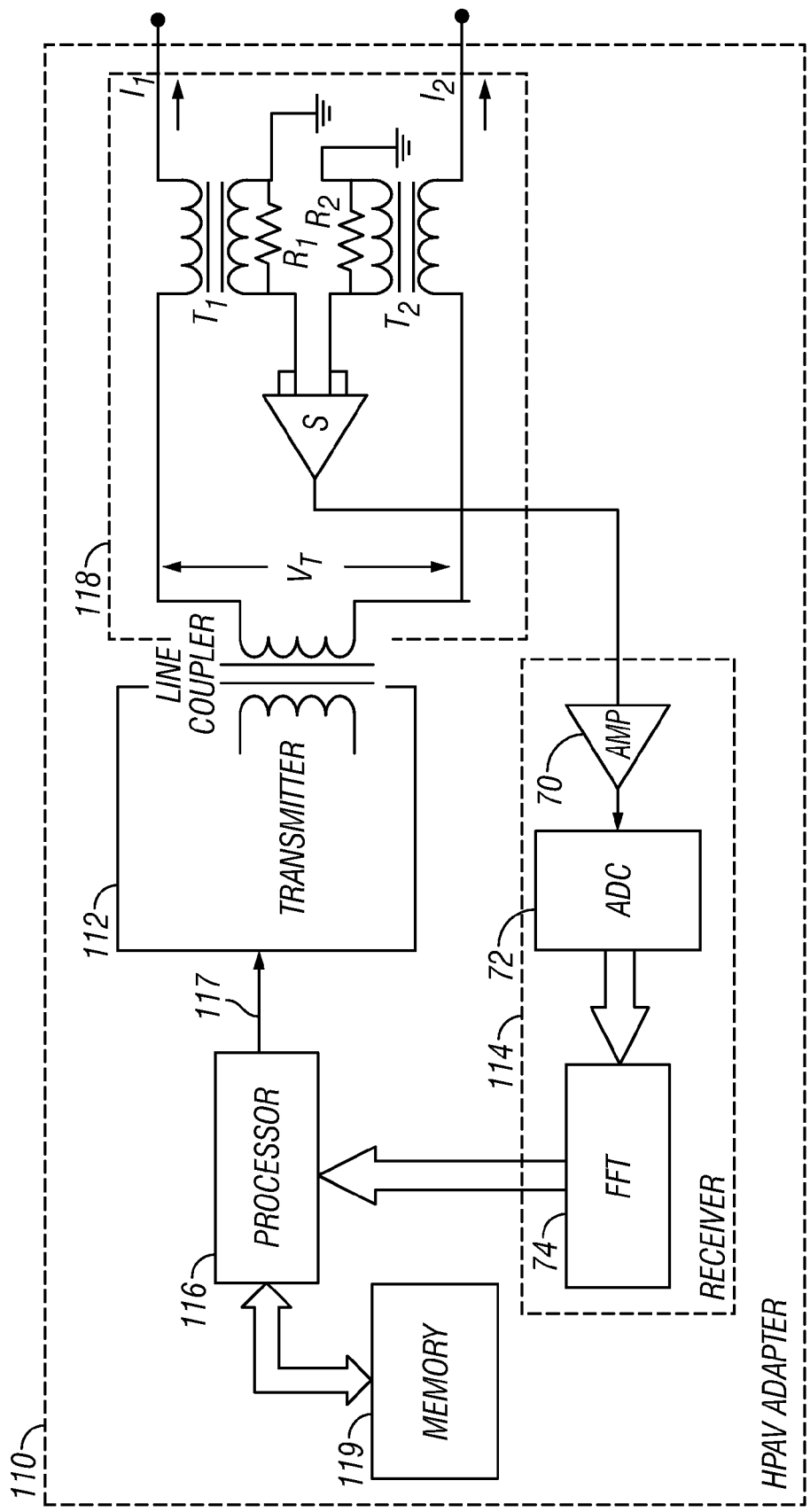
FIG. 5 is a block diagram of an HPAV adapter according to this invention with a probe for detection of Reference common-mode (CM) current $I_{CM}$.

FIG. 5 illustrates an adapter 110 that incorporates a probe 118 for detection of Reference CM current $I_{CM}$. The adapter 110 may be an HPAV adapter with an output port for connection to a HomePlug™ PLC network and may be a separate device with an input port for connection to a PC or CE device, such as an AV device. The HPAV adapter may also be embedded into a PC or CE device, such as an AV device. The adapter 110 is shown as having an adjustable transmitter 112 that is controlled by a processor 116 that sends different power settings to transmitter 112 on line 117. Processor 116 is connected to or includes memory 119 that may include computer program instructions for executing the steps of the invention. During manufacturing of adapter 110, the values of $I_{CM}(a)$ and $V_T(a)$ recorded in steps (4) and (7) immediately above, respectively, may be stored in memory 119, so these values are incorporated into the adapter when it is shipped. Then when the adapter (or the CE device with the embedded adapter) is connected to the actual AC wiring (the PLC network), the processor performs the remaining steps to adjust the output power. The processor may also be programmed to re-adjust the output power each time the adapter or CE device is turned on or at regular intervals, to account for changes in load unbalance on the PLC network.

The reference CM current probe 118 includes two loose-coupled transformers $T_1$ and $T_2$, from which $I_1$ and $I_2$, respectively, are sampled with minimum disturbance to main signal $V_T$ from transmitter 112. Resistors $R_1$ and $R_2$ represent the current sensor elements of precise resistance values that convert current into voltage for summation in the operational amplifier S. The output from S is the difference in voltage across $R_1$ and $R_2$ and is fed into the receiver 114 for processing like a typical input signal. Receiver 114 includes amplifier 70, analog-to-digital converter (ADC) 72, and FFT functional block 74. The adapter 110 is assumed to be in full-duplex operation such that the receiver 114 is available for executing FFT on the measured Reference CM current $I_{CM}$ while the adapter 110 is in transmission mode. The Reference CM current measurement in FIG. 5 is equivalent to Equation (9) with $I_{CM}=I_3$. $T_1$ and $T_2$ should be constructed such that the output voltage on $R_1$ and $R_2$ are out of phase, and the $I_{CM}$ measured is in fact $I_{CM}=|I_1|-|I_2|$. The FFT is illustrated as a functional block of receiver 114 but could be implemented in software and stored in memory 119 as program instructions executable by processor 116.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for increasing the power of a transmission signal from a device connected to a wired communications network without exceeding an allowable common mode current, the method comprising:
    connecting the device to a standard network having a generally fixed impedance;
    measuring the common mode current $I_{CM}(a)$;
    measuring the differential mode voltage $V_T(a)$ of the device in the presence of $I_{CM}(a)$;
    connecting the device to the wired communications network;
    applying a voltage $V_T(a)$ to the device to transmit a signal over the wired communications network;
    measuring the common mode current $I_{CM}(b)$ with the applied voltage $V_T(a)$; and
    if the absolute value of $I_{CM}(b)$ is less than the absolute value of $I_{CM}(a)$, then increasing the voltage from $V_T(a)$ to $V_T(B)$ to transmit a signal over the wired communications network, wherein the voltage increase is proportional to the difference between $I_{CM}(b)$ and $I_{CM}(a)$.

2. The method of claim 1 wherein the allowable common mode current is generally equal to $I_{CM}(a)$.

3. The method of claim 1 wherein the voltage increase in dB is generally equal to the difference between $I_{CM}(b)$ and $I_{CM}(a)$ in dB.

4. The method of claim 1 wherein the wired communications network is an alternating current (AC) powerline communications (PLC) network.

5. The method of claim 4 wherein the transmission signal is transmitted over a plurality of channels, each channel corresponding to a unique frequency, and further comprising performing the method of claim 1 for each of said channels.

6. A method for increasing the power of a signal transmitted over a frequency band including a plurality of subcarrier frequencies from a device connected to an alternating current (AC) powerline communications network (PLC) without exceeding an allowable common mode current at each of said subcarrier frequencies, the method comprising:
    transmitting a signal from the device when connected to a standard network having a generally fixed impedance;
    recording the common mode current $I_{CM}(a)$ on the standard network at each of said frequencies;
    recording the differential mode voltage $V_T(a)$ of the transmitted signal at each of said frequencies;
    connecting the device to the PLC network;
    transmitting a signal having a differential mode voltage $V_T(a)$ at each of said frequencies;
    recording the common mode current $I_{CM}(b)$ on the PLC network at each of said frequencies;
    calculating a common mode current difference value $I_{CM}(b)-I_{CM}(a)$ for each of said frequencies; and
    increasing the power of the transmitted signal, said increased-power signal having a differential mode voltage $V_T(B)$ at each of said frequencies, wherein $V_T(B)$ at each of said frequencies is increased above $V_T(a)$ at each of said frequencies by the absolute value of said common mode current difference value at each of said frequencies.

7. The method of claim 6 wherein recording $V_T(a)$ of the transmitted signal on the standard network at each of said frequencies comprises recording the power spectral density of the transmitted signal.

8. The method of claim 6 wherein recording the common mode current $I_{CM}(a)$ on the standard network at each of said frequencies comprises detecting the common mode current and performing a Fourier transform operation on the detected current.

9. The method of claim 6 wherein recording the common mode current $I_{CM}(b)$ on the PLC network at each of said frequencies comprises detecting the common mode current and performing a Fourier transform operation on the detected current.

* * * * *